United States Patent [19]

Polka

[11] Patent Number: 5,630,653

[45] Date of Patent: May 20, 1997

[54] WHEEL COVER MOUNTING BRACKET

[76] Inventor: John G. Polka, 1355 Margate, Libertyville, Ill. 60048

[21] Appl. No.: 698,480

[22] Filed: Aug. 15, 1996

Related U.S. Application Data

[63] Continuation of Ser. No. 459,711, Jun. 2, 1995, abandoned.

[51] Int. Cl.[6] .................................................. B60B 7/14
[52] U.S. Cl. ........................................ 301/37.37; 301/37.1
[58] Field of Search .............................. 301/37.37, 37.29, 301/37.1, 108.4

[56] References Cited

U.S. PATENT DOCUMENTS

| | | |
|---|---|---|
| 3,202,460 | 8/1965 | Holbrow . |
| 3,833,266 | 9/1974 | Lamme ................................. 301/37 AT |
| 4,079,487 | 3/1978 | Coop, Sr. .................................. 24/277 |
| 4,971,396 | 11/1990 | Morris ................................. 301/37 S |
| 5,042,881 | 8/1991 | Polka ................................. 301/37 S |
| 5,249,845 | 10/1993 | Dubost ................................. 301/37.37 |
| 5,286,092 | 2/1994 | Maxwell, Jr. ........................ 301/37.37 |
| 5,294,189 | 3/1994 | Price et al. .......................... 301/37.37 |
| 5,297,854 | 3/1994 | Nielsen et al. ...................... 301/37.37 |
| 5,443,582 | 8/1995 | Ching ................................. 301/37.37 |

*Primary Examiner*—David M. Mitchell
*Assistant Examiner*—Jonathan J. Yun
*Attorney, Agent, or Firm*—Patnaude, Videbeck & Marsh

[57] ABSTRACT

To attach a wheel cover to a vehicle wheel, mounting brackets are provided which are attached to the lug nuts which retain the wheel to the vehicle hub. Each bracket includes a threaded bore for receiving a screw extended through the wheel cover to retain the cover to the bracket.

16 Claims, 4 Drawing Sheets

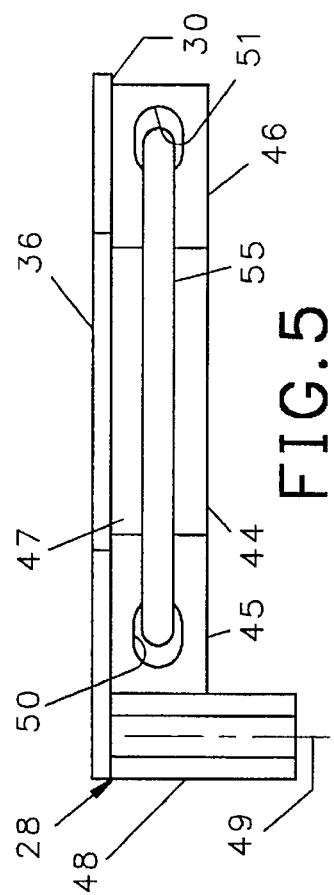
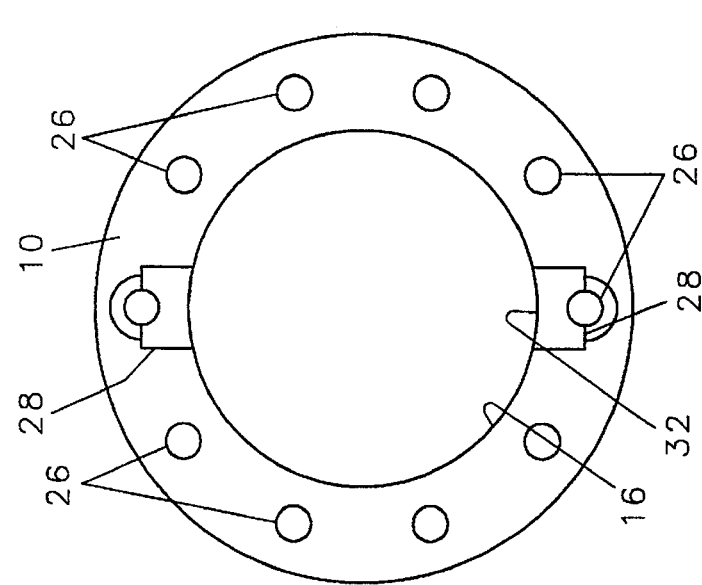
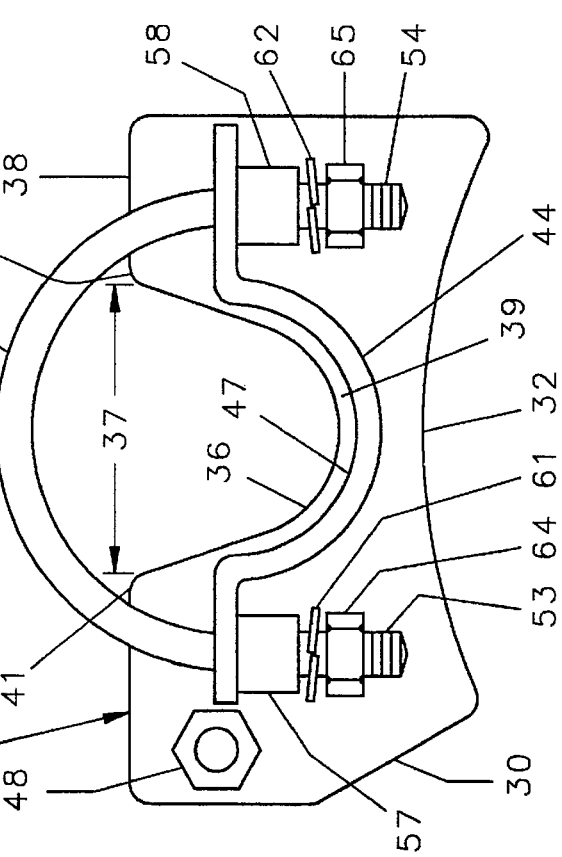

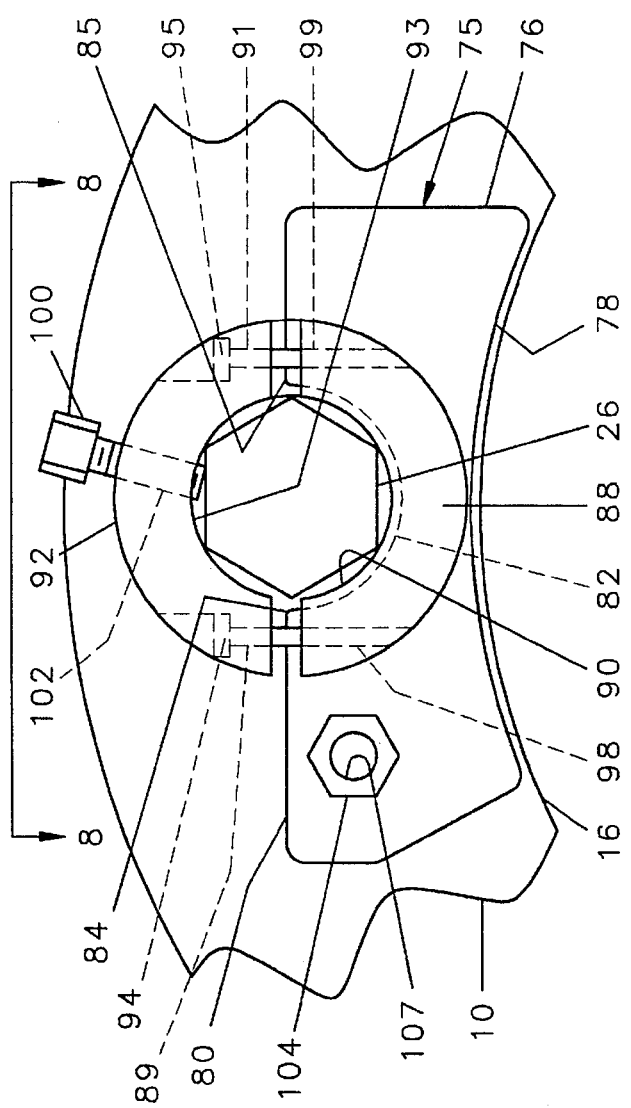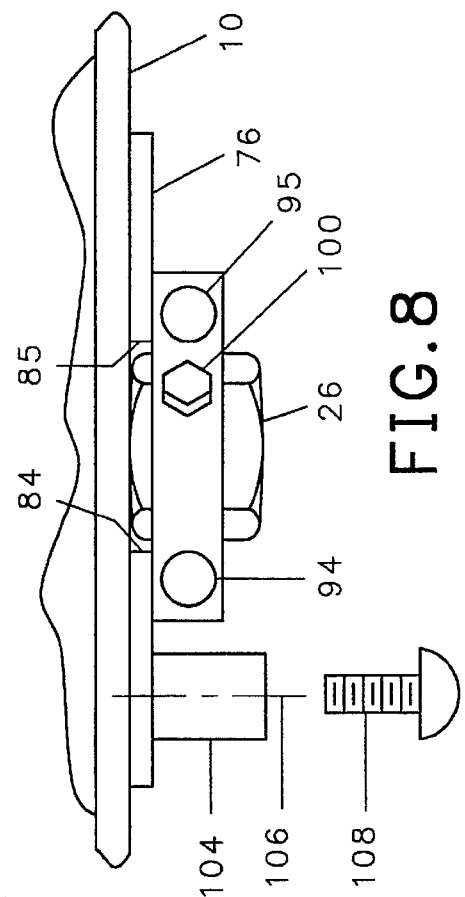

WHEEL COVER MOUNTING BRACKET

This is a continuation of application Ser. No. 08/459,711 filed on Jun. 2, 1995 and now abandoned.

The present invention relates to the mounting of wheel covers on vehicles such as wheel covers which are provided for trucks, and in particular to a bracket for retaining a wheel cover to a wheel.

BACKGROUND OF THE INVENTION

It has become common for truck owners to customize their truck by providing decorative wheel covers, typically made of chrome or stainless steel, to enhance the attractiveness of the central portion of a wheel. Typically, such wheel covers are provided from after market sources, and truck manufacturers do not manufacture their truck wheels with mounting brackets to facilitate the attachment of such wheel covers. As a result, the most common method for attaching such wheel covers is to provide a plurality of space holes around the central portion of the cover to receive the studs to which the wheel is attached. For such wheel covers, the lug nut which attaches the wheel to the vehicle also retains the wheel cover against the wheel.

Certain problems have arisen as a result of the attachment of wheel covers by fitting the wheel cover under the lug nut used to retain the wheel. The lug nuts of truck's wheels, for example, are typically tightened with hydraulic tools, therefore neither the wheel nor the cover can be easily removed. In certain states, for example California, state official may make spot checks of truck wheels for cracks in the wheel webbing, and such checks cannot be undertaken without first removing the wheel cover. Where the wheel cover is retained under a lug nut, such an inspection will require that the truck be taken off a road to a service center, which will result in a considerable delay and inconvenience to the truck operator.

It would be desirable, therefore, to provide a bracket which would attach to the wheel of a truck and into which a wheel cover can be attached without removing the lug nuts which retain the wheel to the hub of the truck to attach or detach the cover.

SUMMARY OF THE INVENTION

Briefly, the present invention is embodied in a mounting bracket for attachment around a lug nut of a vehicle wheel. The bracket includes a base plate adapted to fit against the outward surface of a vehicle wheel adjacent to a lug nut which retains the wheel against the wheel hub. A clamp on the base plate clamps around the outer surface of a lug nut on the wheel to retain the base plate against the wheel. Also, the base plate has an attachment for retaining a wheel cover to the bracket. In one embodiment, the clamp includes a U-bolt which extends around the outer surface of a lug nut, and the attachment is a tubular sleeve having inner threads which is mounted with the axis thereof perpendicular to the plane of the base plate.

To attach a wheel cover to a wheel, two mounting brackets are attached, one to each of two diametrically opposing lug nuts on a wheel. Thereafter, a wheel liner may be attached to the brackets by extending bolts through holes located in the wheel cover such that when the wheel cover is positioned across the open portion of the wheel, the distal ends of the bolts can be threaded into the sleeves of the brackets to thereby retain the wheel cover to the wheel.

In the preferred embodiment, the base plate is substantially planer and has a curved inner edge which can be aligned with the curve of the central opening in the wheel. When the curve of the inner edges of the base plates of the two diametrically opposing mounting brackets are aligned with the curve of the central opening in the wheel, the threaded sleeves will be aligned to receive bolts which are extended through holes in the wheel cover.

GENERAL DESCRIPTION OF THE DRAWINGS

A better understanding of the present invention will be had by a reference to the following detailed description taken in conjunction with the accompanying drawings wherein;

FIG. 2 is a front elevation view of a bracket in accordance with one embodiment of the present invention;

FIG. 5 is a top view of the bracket shown in FIG. 2;

FIG. 6 is a front view of a truck wheel having two brackets attached to lug nuts which retain the wheel;

FIG. 7 is a front elevational view of a bracket in accordance with a second embodiment of the invention attached to a lug nut with portions shown in phantom lines; and FIG. 8 is a top view of the clamp shown in FIG. 7.

DETAILED DESCRIPTION OF PREFERRED EMBODIMENTS

Figure 1:
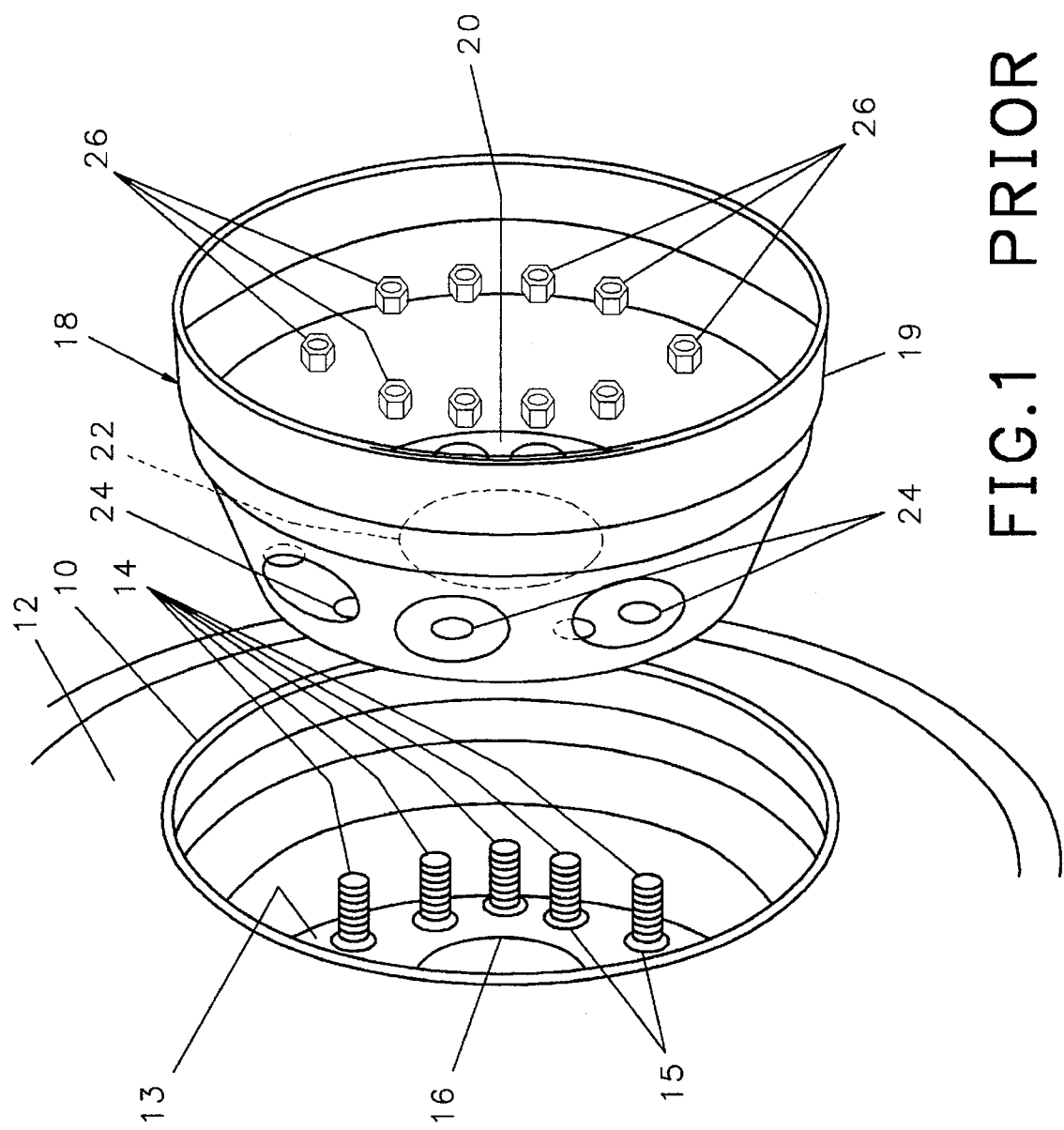
FIG. 1 is an isometric view of a wheel cover which is attachable to a truck wheel by fitting the wheel cover under the lug nuts use to retain the truck wheel, in accordance with the prior art.

Referring to FIG. 1, in accordance with the prior art, a wheel 10 has a tire 12 fitted around the outer perimeter thereof and has a central web 13 which is retained against the hub 11 of a truck, best shown in FIG. 5 by a plurality of spaced studs 14 which extend through complimentarily positioned holes 15 located around a central opening 16 of the wheel. The central opening 16 is adapted to receive an outwardly extending central portion of the axle, not shown.

In accordance with the prior art, a wheel cover 18 has a decorative outer portion 19, and a substantially planer inner web 20. The inner web 20 has a central opening 22 for receiving the outwardly extending central portion of a wheel axle, not shown, and surrounding the central opening 22 are a plurality of spaced openings 24 positioned complimentary to the locations of the studs 14. To retain the wheel cover 18 against the wheel 10, the inner web 20 is positioned against the inner surface of the wheel 10 with the spaced openings 24 fitted around the studs 14. The wheel cover 18 is therefore retained against the wheel 10 by a plurality of lug nuts 26 which are threaded on the studs 14, and therefore the lug nuts 26 which retain the wheel 10 against the hub of a truck also retain the wheel cover 18 thereto.

Referring to FIGS. 3, 4, 5 and 6, a plurality of brackets 28 in accordance with the present invention can be used to retain a wheel cover 18 against the wheel 10. Each bracket 28 has a base plate 30 having an arcuate inner edge 32 which is curved to conform to the shape of the central opening 16 of the wheel 10. The base plate 30 further has a U-shaped indentation 36 along the outer edge 38, which is opposite the arcuate inner edge 32 as can best be seen in FIGS. 2 and 3. The U-shaped indentation 36 is sized such that portions of the base plate 30 fit under the corners 40 of a six sided lug nut 26 of the type used to retain a wheel 10 against the hub of a truck. As can be best seen in FIG. 4, such lug nuts have a chamfer 34 and the distance 37 between the outer ends 41, 43 of the U-shaped indentation 36 should be less than the greatest width 42 of a lug nut 26 such that portions of the base plate 30 will fit into the chamfer 34 and under the corners 40 of the lug nut 26.

Figure 4:
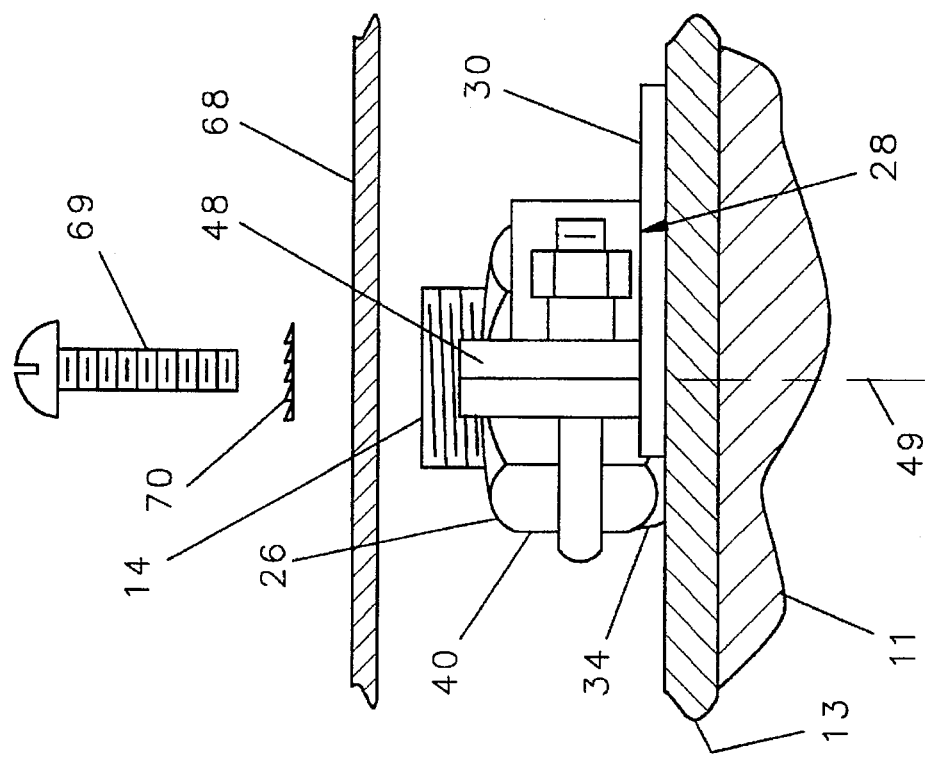
FIG. 4 is a side elevational view of the bracket and lug nut shown in FIG. 3 taken through line 4—4.
Figure 3:
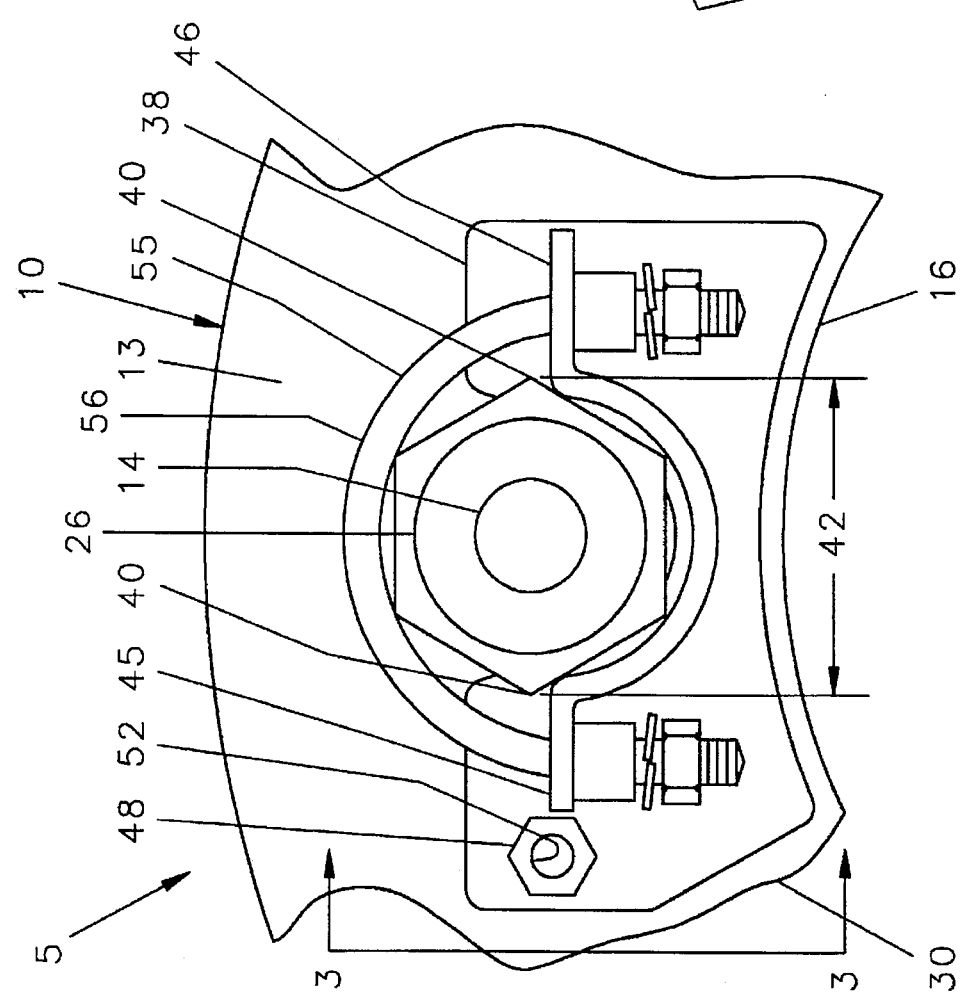
FIG. 3 is a front elevation view of the bracket of FIG. 2 attached to a lug nut of a truck wheel.

Positioned near, but not flush with the edge of the U-shaped indentation 36, is a yoke 44 having arcuate inner surface 47 and opposing outwardly oriented end plates 45, 46. As can be seen, the inner surface 47 of the yolk 44 has a U-shaped contour which is a little wider than the U-shaped indentation 36 of the base plate 30, such that the base plate forms a lip 39 extending inward of the inner surface 47 of the yolk 44. Mounted to one side of the base plate 30 is a tubular sleeve 48 having interior threads, not shown, with the axis 49 of the sleeve 48 perpendicular to the plane of the base plate 30. As best shown in FIG. 5, each of the end plates 45,46 has a transverse hole 50, 51 respectively therethrough. As shown in FIG. 3, 4 and 5, fitted through the holes 50, 51, are the threaded ends 53, 54 of a U-bolt 55, the central portion 56 of which is adapted to fit tightly against the corners 40 of a lug nut 26 to which the bracket 28 is to attach. To retain the U-shaped bolt 55 around a lug nut 26, a pair of spacers 57, 58 are fitted over each of the ends 53, 54 respectively, followed by lock washers 61, 62 respectively and retaining nuts 64, 65 respectively. When the U-bolt 55 of a bracket 28 is fitted around a lug nut 26, with portions of the base plate 32 fitted under corners 40 of the lug nut 26, and the nuts 64, 65 tightened, the bracket 28 will be tightly retained to the lug nut 26.

As best shown in FIG. 4, to attach a wheel cover 68 adapted for use with the present invention to a bracket 28, a threaded screw 69 is fitted through a transverse hole, not shown, in the wheel cover 68, and the distal end thereof is screwed into the threads of the threaded sleeve 48. A star washer 70 is fitted around the stud of the screw 69 to insure that the screw does not loosen as a result of vibration of the wheel 10 while the vehicle is in motion.

As shown in FIG. 6, when two brackets 28 are mounted in diametrically opposing positions around the edges of a wheel 10, a wheel cover 68 having two holes therein positioned complimentary to the threaded openings 52 in the sleeves 48 of the two brackets 28 can be attached thereto. It should also be appreciated that more than two brackets 28 can be used to attach a wheel cover 68 to a wheel 10, although the brackets should be positioned around the wheel so as to maintain wheel balance.

To remove a wheel cover 68 attached to a wheel 10 with brackets 28 in accordance with the present invention, a truck operator merely unscrews the retaining screws 69 from the sleeves 50 thereby disconnecting the wheel cover from the wheel 10.

Referring to FIG. 7 and 8, another embodiment of a clamp 75 in accordance with the present invention is depicted as being fitted around a lug nut 26 of a wheel 10. The clamp 75 of this embodiment also has a base plate 76 having an arcuately shaped inner edge 78 which generally conforms to the shape of the inner opening 16 of a wheel 10. The outer edge 80 of the base plate 76 has a U-shaped indentation 82, with outer ends 84,85, adapted to fit around the outer perimeter of a lug nut 26. Welded to the base plate 76, is an outwardly extending inner first yoke 88 which has an arcuate inner surface 90 adapted to fit against the side of a lug nut 26. As can be seen, in this embodiment, the U-shaper indentation 82 need not be sized to fit portions of the base plate 76 under the chamfer of a lug nut 26. In fact, as shown in FIG. 7 the U-shaped indentation 82 is depicted as being recessed under the inner surface 90 of the inner first yoke 88.

Apposing the inner first yoke 88 is an inwardly directed outer second yoke 92 which has an inner surface 93 adapted to fit around a lug nut 26. The two yoke 88, 92 are retained against the sides of a lug nut by a pair of retaining screws 94, 95 which pass through holes 89,91 in the ends of the outer second yoke 92 and are threaded into complementary threaded holes 98,99 in the inner first yoke 88. To insure that the clamp 75 is tightly fitted around a lug nut 26, a set screw 100 is thread into a complementarily threaded hole 102 in the outer second yoke 92 such that the distal end of the set screw 100 can be tightened against the outer surface of the lug nut 26.

The base plate 76 also has a generally tubular sleeve 104 welded thereto with the axis 106 of the sleeve 104 perpendicular to the plan of the base 76. The inner bore 107 of the sleeve 104 is threaded, and a complementarily threaded screw 108 is passed through a hole is a wheel cover and threaded into the bore 107 to retain a wheel cover, not shown, to the clamp 75.

While the present invention has been described in a single embodiment, it will be appreciated by those skilled in the art that many changes may be made without departing from the true spirit and scope of the present invention. Therefore it is intended by the appended claims to cover all such changes and modification that come within the true spirit and scope of the invention.

I claim:

1. A mounting bracket for attaching a wheel cover to a lug nut used to retain the web of a wheel to a hub, where said lug nut has corners and a given greatest width, said bracket comprising in combination;

a base plate adapted to be fitted against the web of a wheel, said base plate including a lip, clamping means on said base plate for clamping to an outer perimeter of a lug nut and for retaining said lip of said base plate under a corner of a lug nut, said clamping means providing retention of said lip of said base plate under a corner of a lug nut independent of support from any other lug nut, a portion of said clamping means permanently attached to said base plate, and attachment means attached to said mounting bracket for detachably retaining a wheel cover to said mounting bracket.

2. The mounting bracket in accordance with claim 1 wherein said base plate has a U-shaped indentation portion for fitting under a corner of a lug nut.

3. The mounting bracket of claim 2 wherein said U-shaped portion has outer end portions spaced a distance which is less than said greatest distance between corners of a lug nut.

4. The mounting bracket of claim 1 wherein said clamping means includes a yoke for fitting around an outer surface of a lug nut.

5. The mounting bracket of claim 4 wherein said clamping means further includes a U-bolt for fitting around an outer surface of a lug nut.

6. The mounting bracket of claim 1 wherein said attachment means comprises a sleeve having a threaded inner opening, said threaded sleeve mounted with the axis thereof perpendicular to a plane of said base plate.

7. A mounting bracket for attaching a wheel cover to a lug nut used to retain the web of a wheel to a hub, where said lug nut has a chamfer and plurality of corners said bracket comprising in combination;

a base plate adapted to be fitted against the web of a wheel, said base plate having a lip, clamping means on said base plate for clamping to an outer perimeter of a lug nut, and for retaining a portion of said base plate under a chamfer of a lug nut, said clamping means providing retention of said lip of said base plate under a chamfer independent of support from any other lug nut, a portion of said clamping means permanently attached to said base plate, and attachment means attached to said mounting bracket for detachably retaining a wheel cover to said mounting bracket.

8. The mounting bracket in accordance with claim 7 wherein said base plate has a U-shaped portion for fitting against a chamfer of a lug nut.

9. The mounting bracket of claim 8 wherein said U-shaped portion has outer end portions spaced a distance which is less than a greatest distance between said corners of a lug nut.

10. The mounting bracket of claim 7 wherein said clamping means includes a yoke for fitting around an outer surface of a lug nut.

11. The mounting bracket of claim 10 wherein said clamping means further includes a U-bolt for fitting around an outer surface of a lug nut.

12. The mounting bracket of claim 7 wherein said attachment means includes a sleeve having a threaded inner opening, said threaded sleeve mounted with the axis thereof perpendicular to a plane of said base plate.

13. A mounting bracket for attaching a wheel cover to a lug nut used to retain the web of a wheel to a hub, where said lug nut has corners and a given greatest width, said bracket comprising in combination;

a base plate adapted to be fitted against the web of a wheel, said base plate having a U-shaped portion along one side thereof, a yoke permanently attached to said base plate, said yoke sized for fitting against a portion of a lug nut, retention means for retaining said yoke against said portion of a lug nut, said yoke positioned on said plate to retain said U-shaped portion under a corner of said lug nut against which said yoke is retained by retention means, said retention means providing retention of said U-shaped portion of said base plate under a corner of said lug nut independent of support from any other lug nut, and attachment means attached on said bracket for detachably retaining a wheel cover to said mounting bracket.

14. A mounting bracket in accordance with claim 13 wherein said retention means comprises a U-bolt.

15. A mounting bracket for attaching a wheel cover to a lug nut used to retain the web of a wheel to a hub, where said lug nut has a chamfer, said bracket comprising in combination;

a base plate adapted to be fitted against the web of a wheel, said base plate having a U-shaped portion along one side thereof, a yoke permanently attached to said base plate, said yoke sized for fitting against a portion of a lug nut, retention means for retaining said yoke against said portion of a lug nut, said yoke positioned on said base plate to retain said U-shaped portion under a chamfer of said lug nut against which said yoke is retained by said retention means, said retention means providing retention of said U-shaped portion under said chamfer independent of support from any other lug nut, and attachment means attached to said mounting bracket for detachably retaining a wheel cover to said mounting bracket.

16. A mounting bracket in accordance with claim 15 wherein said retention means comprises a U-bolt.

\* \* \* \* \*